July 9, 1957 G. G. CREWSON ET AL 2,798,796
METHOD OF FRACTIONATING SOLUTES DISSOLVED IN A MUTUAL SOLVENT
Filed Jan. 10, 1956 2 Sheets-Sheet 2

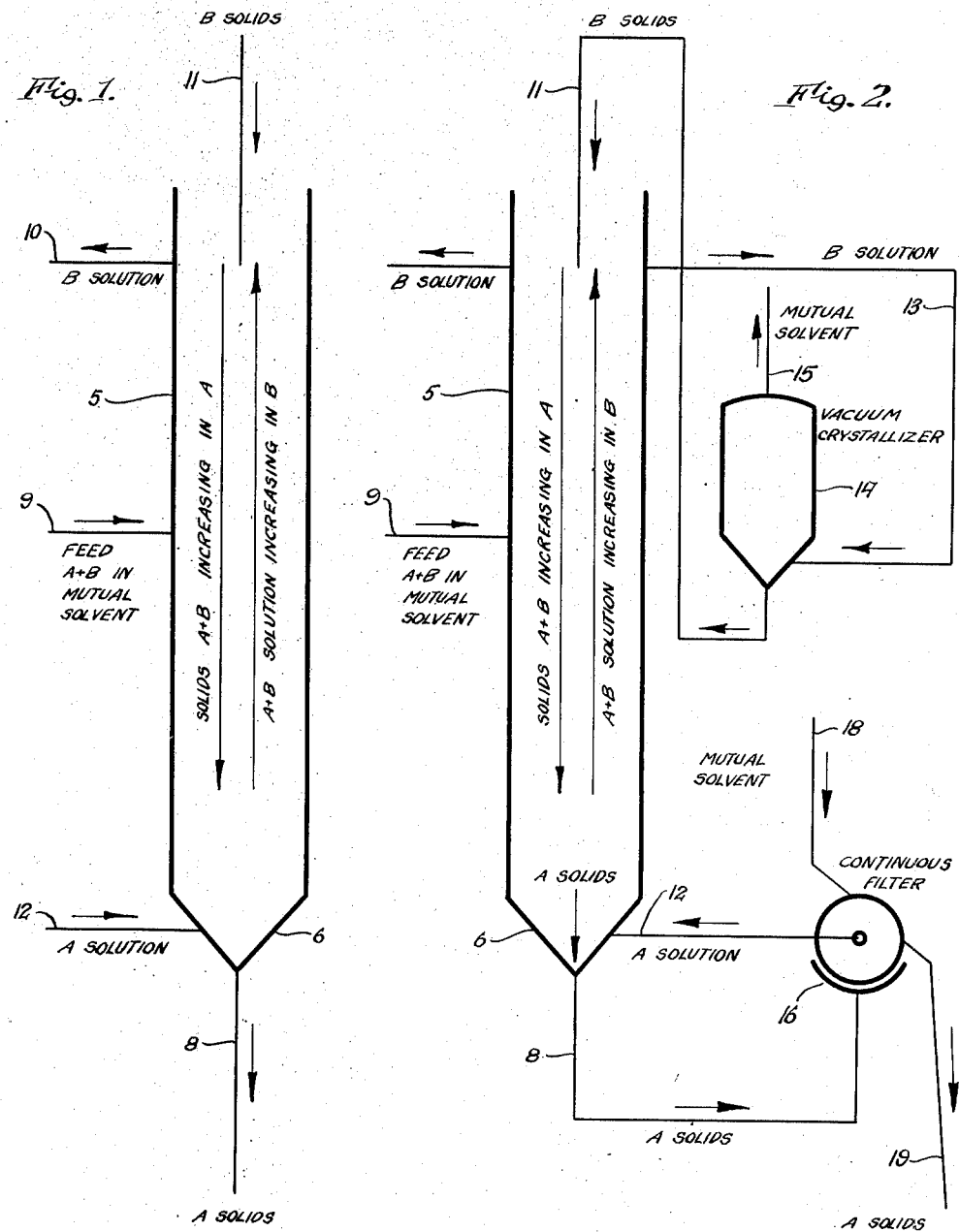

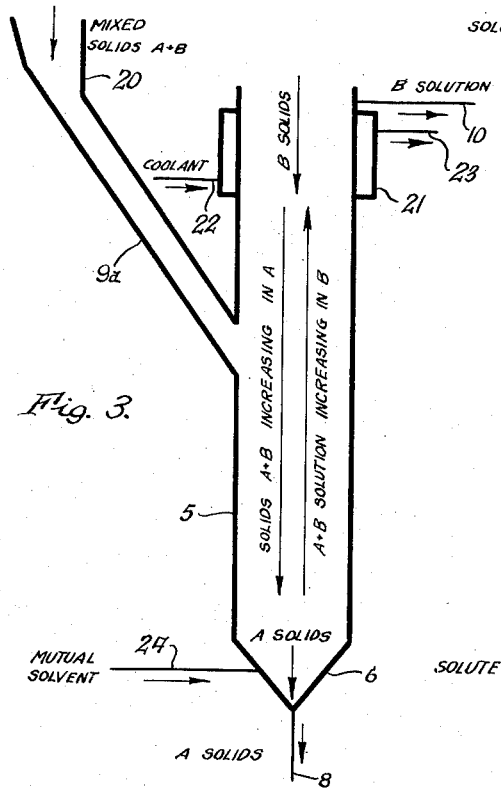

Fig. 3.

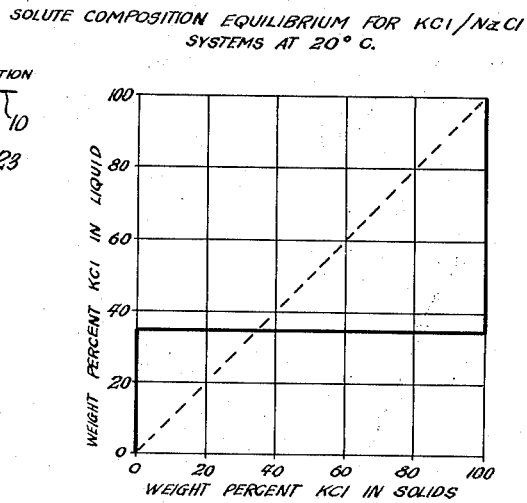

SOLUTE COMPOSITION EQUILIBRIUM FOR KCl/NaCl SYSTEMS AT 20° C.

Fig. 4.

SOLUTE COMPOSITION EQUILIBRIUM DATA FOR $(NH_4)_2SO_4$ $K_2SO_4$ SYSTEMS 25° AND 30° C.

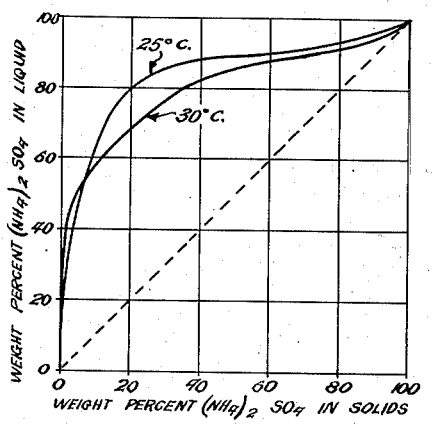

Fig. 5.

SOLUTE COMPOSITION
EQUILIBRIUM CURVE FOR $K_2S_2O_8/(NH_4)_2S_2O_8$ SYSTEMS IN:
DISTILLED WATER AT 22° C.        CURVE A
DILUTE $H_2SO_4$ AT 22° C.       CURVE B
DILUTE $H_2SO_4 + (NH_4)$ AT RANGE   CURVE C
    OF TEMPERATURES OF 10° TO 22°C.

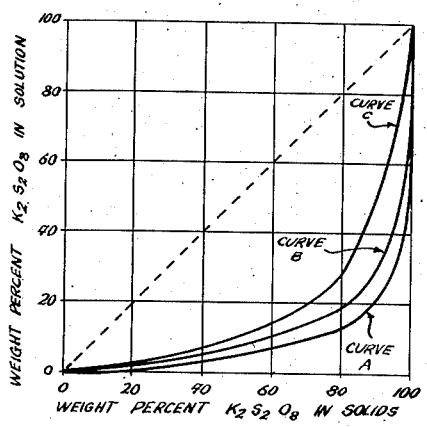

Fig. 6.

INVENTORS
George G. Crewson
Joseph R. Ryan
by Popp and Sommer
Attorneys

United States Patent Office 2,798,796
Patented July 9, 1957

2,798,796

METHOD OF FRACTIONATING SOLUTES DISSOLVED IN A MUTUAL SOLVENT

George Grant Crewson, Snyder, and Joseph R. Ryan, Tonawanda, N. Y., assignors to Food Machinery and Chemical Corporation, San Jose, Calif., a corporation of Delaware Application January 10, 1956, Serial No. 558,351

13 Claims. (Cl. 23—310)

This application is a continuation in part of our copending application Serial No. 263,286, filed December 26, 1951 now abandoned and bearing the same title.

This invention relates to a method of fractionating two or more different solutes from a solution of such solutes dissolved in a mutual solvent, the applicability of the invention being limited to those particular groups of solutes which exhibit solution characteristics hereinafter described and which, in this application are termed "solute composition equilibria." To define such term, the various conditions of equilibria for solutions, with respect to their solutes, must be recognized.

The most generally recognized is that of "saturation equilibrium." This is a temperature function and determines the amount of a solute, or solutes, which can be dissolved in a solvent at a given temperature and is usually represented in the literature, by tables or graphs, showing the variation of quantity of solute or solutes, in a saturated solution, with corresponding variable temperature.

The phenomenon upon which the practice of the invention is based, and which is called herein "solute composition equilibrium" applies only to a limited number of solute substances. It may be defined as that proportion or ratio of one solute to another or other solutes in saturated solution, as related to the proportion or ratio of that same solute component to the other, or others in solid form, when all are present as solids in intimate contact with the saturated solution. In the literature on solubilities, it is generally expressed, by tables or graphs, as the percent of one solute with respect to combined solutes in a solution, as governed by the corresponding percent in the solids in contact with that solution. It is a phenomenon that is generally attributed to inorganic salts or compounds which form "solid solutions" or synonymously "mixed crystals" although other groups of substances not recognized as forming solid solutions, including certain organic mixtures, exhibit similar characteristics. It is therefore not intended that this invention be limited to the fractionation of inorganic salts which form solid solutions only, but it is limited to those substances which exhibit the phenomenon of "solute composition equilibrium" as herein defined.

The solute characteristics required for the practice of this invention, and defined as "solute composition equilibrium" are:

(a) The two or more solutes are both soluble in the same solvent, hereafter termed "mutual solvent."

(b) When there is an excess present, of the two or more solute components, in solid form over and above that which satisfies complete saturation of the mutual solvent, the ratio of the solutes, one to the other, in the solution, is governed by the ratio of the same solute components, one to the other, in the solid phase, when the solids are in intimate contact with the solution.

(c) No temperature change is required to alter the composition of the solute mixture when the ratio of those solute components in the solid phase is changed.

(d) At any given temperature, there is only one composition of solutes in solution corresponding to any one composition of those solute components in solid phase when the solids are in intimate contact with the solution.

(e) When the composition of the solute component mixture, either in solution or in the solid phase is disturbed, there is migration of solutes materials from the solution to the solid phase and from the solid phase to the solution to restore the equilibrium.

(f) Although there may be a shifting or change in the whole series of relative compositions of solute components when temperature is changed, this equilibrium is not a temperature function nor dependent upon temperature change. In the practice of the invention, a change in temperature may increase or may decrease the effectiveness dependent upon the relationship of "saturation equilibrium" to "solute composition equilibrium" for the particular solute components.

As a result of "solute composition equilibrium" as above defined, the following phenomena have been observed and are essential for the practice of the invention:

(1) When solids are precipitated either by cooling or by solvent evaporation or both, from a solution containing two or more solutes which exhibit the required solute composition equilibrium, the same two or more solute components are found in the solid phase but the ratio of the solute materials in the solid phase is dependent upon the ratio of those solutes in the solution.

(2) The solids precipitated as above noted will contain a higher proportion of one solute material and a lower proportion of the other solute material than are the proportions present in the solution. Hence such single crystallization will tend to proportionately deplete the solution as to one solute component, and enrich it as to the other while the solids, as precipitates, become richer in the one and poorer in the other alternatively to the change in the composition of the solutes in solution.

(3) When a mixture of two or more solute components is leached with a mutual solvent, the composition of solutes in the resulting solution is governed by the proportions of the solute materials in the excess solids, and a change in the relative composition of the solids will effect a corresponding change in the composition of the solutes in solution.

(4) When a saturated solution containing one or more of the solutes is brought into intimate contact with the same solute substances in solid form, but when the ratio of those substances in the solids is not that which is in equilibrium with the ratio of the solutes, one to the other, in the solution, there is material migration from the solution to the solid phase and simultaneously from the solid phase to the solution phase in directions tending to restore the solute composition equilibrium, and irrespective of any change in temperature of the solution.

(5) With the existent fixed relationship between ratios of substances in the solutes in solution and the ratios of those substances in the excess solids, there is found to be a consistently higher ratio of one solute substance in the solids than is the ratio in the solution, hence either a crystallization or a leaching step tends to enrich the solids in one component and enrich the solution in the other component.

Examples of inorganic salt pairs which have the required characteristics of solute composition equilibrium, and with water as the mutual solvent are potassium sulfate with ammonium sulfate, potassium persulfate with ammonium persulfate, barium nitrate with lead nitrate, dihydrogen potassium arsenate with dihydrogen potassium phosphate, lead bromide with lead chloride, potassium manganate with potassium chlorate, potassium chloride with potassium bromide, ammonium chloride with nickel chloride, potassium chloride with ammonium chloride, and others.

The present invention is applicable only to those groups or pairs of solutes which exhibit the described particular characteristics of solute composition equilibrium.

As an example, potassium chloride and sodium chloride, as illustrated by the graph, Fig. 4, cannot be fractionated by the practice of this invention, since but one composition of solutes, namely about 34% potassium chloride and 66% sodium chloride is found in the solution at 20° C. irrespective of the ratios of the two salts present in the excess solid phase. Similarly, the invention is not applicable to potassium chloride with potassium sulfate since with an excess of both potassium chloride and potassium sulfate as solids, only one solute composition results, namely, about 97% chloride and 3% sulfate at 25° C.

It is seen that, in the examples noted of salt pairs which can be fractionated by the practice of this invention, there is in each case one ion in common. This fact supports the presumption that materials which conform to the required solute composition equilibrium characteristics are those which form solid solutions but it would be presumptuous to assume that only such salt pairs have the required characteristics and the application is therefore not limited to inorganic salts which form solid solutions.

When a group or pair of substances do exhibit the required solute composition equilibrium characteristics, the ease or convenience of their separation depends upon the divergence in composition ratios in the solution and solid phases. As examples, the following are noted: With a mixture of dihydrogen potassium phosphate and dihydrogen potassium arsenate at 7° C., a solid phase containing 80% of the phosphate and 20% arsenate is in equilibrium with a solution phase in which the solutes are 75% phosphate and 25% arsenate. Similarly, a solid phase containing 20% of the phosphate and 80% of the arsenate is in equilibrium with a solute composition of 16% of the phosphate and 84% of the arsenate.

In comparison, as illustrated by the graph, Fig. 5, the sulfates of ammonium and potassium exhibit much greater divergence in compositions. Solids containing 80% of potassium sulfate and 20% of ammonium sulfate are in equilibrium with solutes made up of 20% potassium sulfate and 80% ammonium sulfate, and solids containing 20% potassium sulfate and 80% ammonium sulfate are in equilibrium with a solute composition of 6% potassium sulfate and 94% ammonium sulfate, these ratios being at 25° C.

Obviously, while the solutes from both solutions may be fractionated by taking advantage of their solute composition equilibrium characteristics, the latter pair may be so separated with greater ease and convenience than can the former pair. Should there be a solute composition that is in equilibrium with the same composition in solid phase, then obviously, the solute components cannot be separated by any number of fractional crystallizations nor by practice of this invention.

An accepted method of fractionating solutes wherein one component tends to predominate in the solution phase and the other component tends to predominate in the solid phase is by a series of fractional crystallizations. By such procedure, a saturated solution is cooled precipitating solids. These solids are richer in one solute component and poorer in the other than was the original solution while the solution remaining is depleted in both components but in the one more than the other.

The precipitated solids, if redissolved at higher temperatures, then form a new solution, more concentrated as to one solute component than was the original solution, yet weaker as to the other component. Recrystallization of this solution still further enriches the solid phase in the one solute component and be repetition of the same procedure sufficient number of times with both solids and mother liquor from each stage, eventually the two solute components may be separated into relatively pure form. Such procedure is costly as to equipment and processing costs and the practice of this invention permits continuous and economical separation of such solutes.

To again differentiate between the practice of this invention and accepted procedure taking advantage of the other form of equilibrium termed "saturation equilibrium," the latter may be considered.

Assume two substances, present in solid form in intimate mixture and which it is desired to separate. One of these may have a large variation in solubility with temperature change. Its saturation equilibrium curve, plotted as the amount of the substance in a unit quantity of solvent, versus temperature, will then be steep.

Assume that the other substance exhibits a much flatter saturation equilibrium curve or, in other words, the variation in total solubility with changing temperature, is relatively lower as compared with the first substance.

A mixture of such substances as solids subjected to a succession of leaching operations, or a continuous leaching series, wherein the solid materials pass from a lower to a higher temperature while a solvent passes from a higher to a lower temperature in counterflow to the material, will then result in effectively leaching out the substance more susceptible to temperature change. Such procedure is particularly applicable when the solvent used has little or no capacity for dissolving the one substance but is extractive as to the other substance.

Such method of separation is one utilizing the phenomenon of saturation equilibrium. It requires temperature changes or gradient with or without a solvent which is extractive as to one solute component to a greater degree than to the other. It is in effect a system of progressive leachings with ascending temperature and is not related to the practice of this invention wherein both materials are soluble in a mutual solvent, temperature change or gradient is not an essential and could even be a detriment, and in which the characteristics of solute composition equilibrium is the governing requirement.

In contrast, with a pair of solutes subject to solute composition equilibrium, partial crystallization of the solution of these solutes will result in the formation of solids containing both solute components in an admixture wherein the solute component tending to predominate in the solid phase, designated in the drawings as the solute component A, is in higher proportion than it is existent in the solutes of the solution. A step in the separation of the two solute components is then accomplished. Conversely, a partial leaching of such mixed solids with a mutual solvent will result in a saturated solution in which the component A tending to predominate in the solid phase is in lower proportion than it is existent in the solids, this accomplishing an additional step in the separation of the two solute components. The solute component tending to predominate in the solution is designated in the drawings as B.

The driving force to establish such equilibrium has been found sufficient to accomplish migration in both directions when a saturated solution of solutes subject to solute composition equilibrium is brought into intimate contact with a solids mixture of these components with which the solution is not in such solute composition equilibrium. This migration will occur at constant temperature unless relative solution heats, radiation or the like, cause incidental and immaterial temperature change.

If, for example, a solid salt mixture containing 80% dihydrogen potassium arsenate ($KH_2AsO_4$) and 20% dihydrogen potassium phosphate ($KH_2PO_4$) is introduced into a solution containing 60% $KH_2AsO_4$ and 40%

$KH_2PO_4$, these ratios of the salts in the solid and solution phases not being in solute composition equilibrium with each other, and held in intimate contact for sufficient time, some $KH_2AsO_4$ (or the ion $AsO_4$) will migrate from the solids into the solution and some $KH_2PO_4$ (or the ion $PO_4$) will simultaneously migrate from the solution into the solids until the compositions of the solutions and the solids are readjusted to establish equilibrium. The driving force is solute composition equilibrium as previously defined, the migration is independent of saturation equilibrium and temperature change at all times, and the migration takes place in a solution which is saturated.

The practice of the present invention involves repetition of this digestion by providing B solids at one end of the system and moving them toward the other end of the system in contact with solutions successively poorer in the B but richer in the A solute so as to result in the purging from the solids of all of the B solute component to provide at the other end of the system an effluent of relatively pure A solids. It has further been found that at this other end of the system, there must be provided or introduced a solution of the A component of required purity. This provision or introduction of an A solution at this other end of the system acts as a reflux in establishing the purity of the A solids removed from this other end of the system, the purity of the A solids removed being established by the purity of the A solution employed as a reflux at this other end of the system. The provision of this A solution as a reflux at this other end of the system can come from any source, including redissolving some of the solids leaving this other end of the system, or the introduction of the mutual solvent into this other end of the system thereby redissolving some of the substantially pure A component already present in this other end of the system.

In the practice of the present invention, the solution also moves toward the one end of the system and is contacted progressively with solids progressively poorer in the A solute component and richer in the B solute component until substantially all of the A solute has been removed from the solution and the effluent from this opposite end of the system is a solution of B in substantially pure form. It has further been found that at this one end of the system solids, which contain substantially only the B component, must be provided if such solution of substantially pure B solute is to be removed from this one end of the system. This feed of substantially pure B solids acts as a reflux in establishing the purity of the B solution removed from this one end of the system, the purity of the B solution being removed being established by the purity of the B solids employed as a reflux at this one end of the system. The provision or introduction of these B solids as a reflux at this one end of the system can come from any source, including crystallizing some of the B solution leaving this one end of the system either by cooling or evaporating some of the B solution within or external to the counterflow unit or system.

In the practice of this invention, with countercurrent flows of solids and solutions established as above described, the solute components to be separated, or fractionated, are introduced into the system either as a solution containing such components as solutes, or as a mixture in solid phase, at a point intermediate to the two termini of the system. Preferably, such point of feed introduction should be that where—

(a) The solution composition within the system is approximately that of the feed should said feed be introduced as a solution; or (b) The solids composition within the system is approximately that of the feed should the feed be a mixture of solids.

With such feed provision, the amount of B in solution removed from one end of the system corresponds to the amount of B in the feed plus the amount of B introduced as solids at said one end of the system.

Similarly, the amount of A removed from the other end of the system corresponds to the amount of A in the feed plus the amount of A introduced as solution at that other end of the system. Also, similarly the amount of mutual solvent removed at one end of the system is that present in the feed plus that introduced with the refluxed saturated solution at the other end of the system.

The particular means of providing a supply of A solution at this other end of the system and B solids at this one end of the system are not important in the practice of the invention although the introduction of such A solution and B solids as a reflux at each end of the system is essential to the practice of the invention.

A convenient method of initiating the operation of this process would be to:

(1) Fill the system with a solution of either or both solute components in the mutual solvent.

(2) Initiate continuous feed of solution or solids of substances to be fractionated.

(3) Initiate reflux of pure B solids at the one end of the system, or reflux of solids crystallized from the solution effluent from the one end of the system, corresponding to the desired method of continuous operation.

(4) Initiate reflux of pure A solution at the other end of the system or of redissolved solids removed from said other end of the system.

(5) Initially the effluent from the one end of the system will not be of the pure B component and from the other end of the system of the pure A component but gradually the composition gradient within the system will automatically become established and purity of effluents effected.

In a practical application of the present process, a series of individual steps of mixing solids with solution can be employed or a continuous counterflow of the solids and solution can be utilized. In the latter case, the countercurrent movement of the solids and solution can be effected by a mechanical conveyer, but for simplicity, it is preferred that the countercurrent movement be effected by gravity in a vertical tube containing the solution and in which the solids settle to the bottom or rise to the top depending upon the specific gravity of the solids in relation to the solution.

Accordingly, one of the principal objects of the present invention is to provide a method for separating two or more solutes having such solute composition equilibrium characteristics as will provide drive to maintain such equilibrium.

Another object is to provide such a method by which the solutes are separated continuously.

Another object is to provide such a method which is not highly critical in its operation.

Another object is to provide such a method which can be carried out with simple and relatively inexpensive apparatus and with little supervision.

Another object is to provide such a process in which the solute components to be fractionated can be fed in either solution or solid form.

Another object is to provide such a method in which the solute components used as a reflux can be produced in the required solid and solution form from the end products leaving the apparatus in a number of different economical ways.

Another object is to provide such a process in which the major part of one solute component can be provided by reaction with another solute, in the same leg or tube in which fractionation takes place, with a reagent to produce the one solute.

Another object is to provide such a process which is essentially carried out in a simple vertical tube and in which the required counterflow of the solid and solution phases is effected by gravity and in which the required slow vertical movement of the solid phase is achieved by permitting the solids to loosely support one another and slowly move as a column toward the corresponding end of the tube.

Other objects and advantages will appear from the following description and drawings in which:

Fig. 1 is a schematic vertical elevational view of one form of apparatus suitable for carrying out the present invention and utilizng a solution as the feed.

Fig. 2 is a similar view additionally showing auxiliary structures suitable for converting each of the end products into the required form to serve as a reflux in maintaining the required purity of each end product.

Fig. 3 is a similar view illustrating the manner in which the feed can be in the form of solids and also illustrating other forms of auxiliary structures suitable for converting each of the end products into the required form to serve as a reflux in maintaining the required purity of each end product.

Fig. 4 is a graph of solute composition equilibrium data for potassium chloride with sodium chloride to illustrate a pair of solutes to which the present invention is not applicable.

Fig. 5 is a graph of solute composition equilibrium data for ammonium sulfate and potassium sulfate at two different temperatures to illustrate a pair of solutes to which the present invention is applicable.

Fig. 6 is a graph of solute composition equilibrium data for potassium persulfate and ammonium persulfate with different mutual solvents, to which pair of solutes, in each mutual solvent, the present invention is applicable.

Referring to Fig. 1, this figure illustrates the apparatus suitable for carrying out the essentials of the present invention with any of the solutions specifically listed as examples of solutions subject to fractionation in accordance with the process of this invention. Non-essential details have been deliberately avoided in Fig. 1.

The apparatus so illustrated in Fig. 1 includes a vertical tube or cylinder 5 having a conical bottom 6 leading to an outlet line 8 for the substantially pure A solids withdrawn from the system.

It is assumed that the feed is in the form of a solution of the A and B solutes dissolved in a mutual solvent. This feed solution is introduced through a feed line 9 at the side of the vertical tube 5. The B solute, in substantially pure form, is removed as a solution from the upper end of the tube 5 through a solution outlet line 10. An important feature of the invention, and which determines the purity of the A solids and B solution withdrawn from the vertical tube, resides in the introduction of B solids at the upper end of the tube 5 through a B solids inlet line 11 and in the introduction of substantially pure A solution near the bottom of the vertical tube 5 through an A solution inlet line 12.

The form of the apparatus shown in Fig. 2 operates in identically the same manner as the form illustrated and described in connection with Fig. 1 and it merely illustrates convenient means whereby the relatively pure A solution, used as a reflux at the bottom of the vertical tube 5, and the substantially pure B solids, used as a reflux at the upper end of this tube, can be conveniently produced from the end products of the system.

As with the form of the invention shown in Fig. 1, it is assumed that the A solids settle in a vertical tube 5 provided with a conical bottom 6 and which terminates in an outlet line 8 through which the substantially pure A solids pass in the form of a slurry from the vertical tube 5. Also, as with Fig. 1, Fig. 2 illustrates a feed of the A and B solutes dissolved in a mutual solvent through a feed line 9 in the side of the vertical tube 5.

Also, as with Fig. 1, in Fig. 2, the relatively pure B component is shown as removed from the vertical tube 5 in the form of a solution through an outlet line 10 near the top of the tube.

B solids are also introduced at the top of the vertical tube 5 through a line 11. Fig. 2 illustrates a convenient and practicable way of obtaining such substantially pure B solids so used as a reflux to obtain the desired purity of the B solution withdrawn at 10. Thus, the numeral 13 represents an outlet line connected with the upper end of the vertical tube 5 and through which the substantially pure B solution present at the top of the vertical tube 5 is withdrawn and introduced into a vacuum crystallizer 14. In this vacuum crystallizer, part of the solvent used in the system is withdrawn as a vapor through the vacuum line 15 so as to cool and evaporate the solution in the crystallizer and produce crystals which pass from the vacuum crystallizer through the line 11 back to the upper end of the vertical tube 5 to act as a reflux as described in connection with Fig. 1.

As with the form of the invention shown in Fig. 1, a substantially pure solution of the A component, dissolved in the mutual solvent, is introduced into the bottom of the vertical tube 5 through a line 12 to act as a reflux in determining the purity of the A solids withdrawn at 8. In Fig. 2, there is illustrated a convenient means for producing such relatively pure solution to be introduced at 12 from the relatively pure A solids withdrawn from the bottom of the vertical tube 5. Thus, the A solids from 8 are introduced into a continuous filter 16. This filter is supplied with the mutual solvent used in the system through a supply line 18. The filtered A solids pass from the filter through an outlet line 19 as one end product of the system. The solvent introduced into the continuous filter 16 dissolves part of the A solids being filtered in 16 and forms a substantially pure A solution which passes from the continuous filter 16 through the line 12 to act as a reflux as previously described.

The modification shown in Fig. 3 functions essentially in the same manner as the form of the invention illustrated and described in connection with Fig. 1, but illustrates the manner in which the mixed solute components A and B can be fed to the system in solid form. The modification shown in Fig. 3 also illustrates additional ways in which the substantially pure solids used as a reflux at the top of the vertical tube 5 can be produced from the relatively pure B solution existing at the top of this tube. Fig. 3 also illustrates another way in which relatively pure A solution can be produced for use as a reflux at the lower end of the vertical tube from the relatively pure A crystals withdrawn from the bottom of the tube.

As with the form of the invention shown in Fig. 1, the fractionation is carried out in a vertical tube 5 having a conical bottom 6 through which the A solids, which are assumed to be heavier than the liquid solution in the vertical tube, settle and are removed through a line 8. Instead, however, of feeding a solution of A and B dissolved in a mutual solvent, the feed in Fig. 3 is in the form of a large inclined tube 9a through which mixed A and B solids are fed through the side of the vertical tube 5. The inclined tube 9a is shown as extending to a point above the liquid level in the vertical tube 5 and as terminating in a hopper 20 for receiving the mixed A and B solids.

As with the form of the invention shown in Fig. 1, the substantially pure B solution is withdrawn from the vertical tube 5 through an outlet line 10 but a further manner of obtaining relatively pure B crystals as a reflux in determining the purity of the B solution withdrawn at 10 is illustrated. Thus, the upper end of the vertical tube 5 is shown as surrounded by a jacket 21 through which a coolant is circulated, this coolant being introduced at 22 and removed at 23. The saturated solution at the top of the vertical tube 5 is thereby cooled and since at the level of withdrawal of the solution at 10, it is a substantially pure B solution, the crystals formed will be substantially pure B crystals.

Fig. 3 also illustrates another manner in which substantially pure A solution can be produced at the bottom of the vertical tube 5. The A solids in the bottom 6 of the vertical tube 5 are substantially pure and hence a substantially pure A solution can be produced by the simple expedient or introducing the mutual solvent used in the system through a solvent line 24 into the bottom of the vertical tube or leg 5. This solvent dissolves some of the relatively pure A crystals in the bottom 6 and provides the necessary relatively pure A solution used as a reflux in determining the purity of the A solids withdrawn from the system.

In the operation of the process forming the subject of the present invention, any of the groups of solutes heretofore specifically enumerated can be fed to the system for the purpose of fractionating the solution into its solute components. If the feed is in the form of a liquid solution with the solutes dissolved in the common solvent, the forms of the invention shown in Figs. 1 and 2 would be employed and the solution would be fed into the vertical tube 5 through the solution inlet 9. Preferably, the feed line 9 is located at the level where the solution within the vertical tube 5 has approximately the same composition of solutes as the feed solution. Preferably, the feed solution is saturated or nearly so.

If the feed is in solid form, that is, in the form of combined solids of the groups of solute substances heretofore enumerated, the apparatus shown in Fig. 3 would be employed. In this form of the invention, the combined solids to be fractionated are supplied to the hopper 20 and descend by gravity through the tube 9a into the vertical tube 5 where the combined solids come in contact with the mutual solvent admitted through the line 24. The lower end of the combined solids inlet tube 9a is preferably at the level where the composition of the solids in the vertical tube approximates the composition of the solids being fed through the feed tube 9a.

The practice of the invention will be particularly described in connection with the fractionation of ammonium and potassium persulfates which can be readily separated in a continuous process using the apparatus as illustrated particularly in that in water or acid solutions, the potassium persulfate to ammonium persulfate equilibrium ratio in the solids, as illustrated in Fig. 6, is consistently much greater than the similar ratio in the solution. The greater the differential in these ratios, the easier the separation of the solute components in the practice of the present invention and the closer the approach to identical ratios in the solutes and in the solids, the greater the time of contact required between the solid and liquid phases in effecting fractionation. With ammonium and potassium persulfates, ammonium persulfate is the B solute which tends to predominate in the solution phase and potassium persulfate is the A solute which tends to predominate in the solid phase.

For economy and to avoid decomposition, the feed solution of these persulfates is preferably within the temperature range of 0° C. to 40° C. throughout which range the required solute composition equilibrium characteristics exist. The mutual solvent for these persulfates can be water although aqueous sulfuric acid solutions have also been used. The proportion of potassium and ammonium persulfates in the solution or solids fed to the system is not critical, a proportion of two parts of ammonium persulfate to one part of potassium persulfate, for example, having been employed.

Solids of the ammonium persulfate or B solute are introduced into the vertical tube 5 at the top thereof, these solids serving as a reflux and hence their purity determining the purity of the ammonium persulfate solution removed from the vertical tube through the outlet 10. These ammonium persulfate or B solids can be obtained from any source and in the form of the invention shown in Fig. 1 could be obtained from commercial sources and introduced through the line 11. Since, however, the ammonium persulfate or B solution being withdrawn from the top of the vertical tube 5 is substantially pure, it is economically desirable to crystallize a part of this substantially pure ammonium persulfate or B solution and introduce these crystals into the top of the vertical tube 5. This can be done in a number of ways as by withdrawing a part of the ammonium persulfate or B solution from the top of the vertical tube 5 and passing it through the vacuum crystallizer 14 as shown in Fig. 2 returning the substantially pure ammonium persulfate or B solids to the top of the vertical tube through the line 11. Alternatively this crystallization can be effected by cooling the substantially pure ammonium persulfate or B solution at the top of the vertical tube 5 either by recirculating a part of this substantially pure ammonium persulfate or B solution through a cooler or by providing a cooling jacket 21 directly around the upper end of the vertical tube 5 as illustrated in Fig. 3.

Regardless of how the substantially pure ammonium persulfate or B solids are produced, these solids settle toward the bottom of this vertical tube. Starting from a solution of substantially pure ammonium persulfate or B solute, these ammonium persulfate or B solids progressively contact a saturated solution which is progressively richer in potassium persulfate. When the substantially pure ammonium persulfate or B solids contact a solution containing a mixture of potassium persulfate and ammonium persulfate or A and B, the ratio of these persulfates in the solution phase is immediately out of equilibrium with the pure ammonium persulfate or B component of the solid phase and there is a drive to establish a condition of equilibrium. With this drive a part of the B solute or ammonium persulfate (or the ammonium ion) migrates from the solid phase to the solution phase and, conversely, a part of the A solute or potassium persulfate (or the potassium ion) migrates from the liquid phase into the solid phase. Accordingly, the descending solids acquire some of the A solute or potassium persulfate which tends to predominate in the solid phase, and the solution at the top of the vertical tube has not only given up some of its potassium persulfate or A solute but also has acquired additional ammonium persulfate or B solute so as to approach substantial purity in ammonium persulfate.

Since the feed to the vertical tube 5 includes the mutual solvent introduced either as a part of the feed solution through the line 9 in Figs. 1 and 2, or separately through the line 24 in Fig. 3, and since in addition there is refluxed A solution admitted at 12 in Figs. 1 and 2 or formed from the solvent admitted at 24, Fig. 3, the movement of the solution in the vertical tube 5 is upward from the bottom toward the top of the vertical tube where the solution is substantially pure ammonium persulfate or B.

Accordingly, as the solids introduced at the top of this vertical tube continue to settle, they encounter a solution which is progressively richer in the potassium persulfate or A solution. Hence, the originally substantially pure ammonium persulfate or B solids, having acquired some potassium or A solute, settle into a solution in which the ratio of the A and B solutes is again out of equilibrium with the ratio of these solutes in the descending solids. Accordingly, the drive to maintain equilibrium continues and more ammonium persulate or B solute migrates from the solid phase to the solution phase and more potassium persulfate or A solute migrates from the solution into the solid phase. This action continues as the solids settle toward the bottom 6 of the vertical tube and it will be seen that in such settling, the descending solids become progressively more enriched in the potassium persulfate or A and depleted in the ammonium persulfate or B and the ascending solution simultaneously becomes progressively more enriched in the ammonium persulfate or B and impoverished in the potassium persulfate or A until at the lower end of the system both solids and solutes are essentially pure potassium persulfate or A and at the upper end of the system, both solids and solution are essentially pure ammonium persulfate or B, and the two components may be separately withdrawn from their respective termini.

In actual practice, the solids introduced at the top of the vertical tube do not descend as free falling solids but build up in the vertical tube 5 as a loose mass or heavy slurry which is readily disturbed when the solution in this vertical tube is agitated. When introduced in solid form as shown in Fig. 3, a loose solid mass likewise builds up in the vertical tube 5. In either event, the solids contained in the tube 5 are not in the form of a packed mass but are loose and easily placed in motion and are more accurately described as a loose mass or heavy slurry in which the solids are supported by one another but are readily disturbed. It is desirable that this loose mass occupies substantially the full height of the solution in the vertical tube 5, to provide the required solid-solution contact time in a tube of desirable height. Slow settling is achieved by adjusting the rate of withdrawal of the A or potassium persulfate crystals through the outlet line 8 at the bottom of the vertical tube 5, this in turn determining the feed of the various materials, of course. The rate of withdrawal of the potassium persulfate crystals is dependent on the cross sectional area of the loose mass of solids in the vertical tube 5 and by the necessity of maintaining this loose mass at the height required to provide the necessary time of contact between the solid and solution phases to insure interchange of the solute components from one phase to the other. With potassium and ammonium persulfates in equal proportions, this time of contact is in the order of one to two hours and the height of the vertical tube 5 can be from 10 to 20 feet whereas with barium and lead nitrates, a substantially greater tube length or longer contact time would be required.

Since the rising solution in the vertical tube 5 is in intimate contact with the column or loose mass of solids for substantially the full height of the solution, the solution is necessarily substantially saturated throughout its entire course through the vertical tube 5.

An essential feature of the invention resides in the introduction of a substantially pure solution of potassium persulfate of A solute at the bottom 6 of the vertical tube to act as a reflux, the degree of purity of the solution so introduced through the line 12 determining the degree of purity of the potassium persulfate or A solids withdrawn from the vertical tube 5 through the outlet line 8. Thus, the potassium persulfate or A solution admitted through the line 12 acts as a reflux in determining the purity of the potassium persulfate or A solids withdrawn from the bottom of the vertical tube 5 in the same manner as the introduction of ammonium persulfate or B solids at the top of the vertical tube 5 determines the purity of the ammonium persulfate or B solution withdrawn from the top of the vertical tube through the line 10. As illustrated in Fig. 1, the potassium persulfate or A solution introduced through the line 12 can come from any source, including obtaining such solution commercially. Since, however, the solids in the bottom of the vertical tube 5 and leaving this tube through the line 8 are substantially pure potassium persulfate or A, the solution introduced at 12 can advantageously be obtained by dissolving a part of these solids. This can be done simply and directly by introducing the mutual solvent through a line 24 into the bottom 6 of the vertical tube as shown in Fig. 3. This can also be accomplished by passing the slurry withdrawn through the line 8 through a continuous filter 16 as shown in Fig. 2 and supplying this filter through 18 with the mutual solvent for the solutes being fractionated, this mutual solvent dissolving a part of the A or potassium persulfate solids in the continuous filter 16 and the solution so formed being conducted through the line 12 to the bottom 6 of the vertical tube 5 as illustrated in Fig. 2.

It will also be understood that the solutes to be fractionated are not necessarily introduced into the vertical tube 5 at such solutes, but that one can be in whole or in part formed in the tube 5. Thus, assuming an available solution containing a large amount of ammonium persulfate and a small amount of potassium persulfate, but that the desired end product is potassium persulfate, advantageously the vertical tube 5 could be supplied with this solution and in addition, a quantity of a suitable potassium salt other than potassium persulfate. Such other suitable potassium salt, such as potassium sulfate, would react with the ammonium persulfate in the leg or tube 5 to produce the desired potassium persulfate, the desired end product, and this potassium persulfate, the desired end product, can be readily separated from the remaining ammonium persulfate and sulfate in the same manner as previously described. In this application, there are two basic and two acid ions, any pair of which have the solute composition equilibrium characteristics required for the practice of the present invention. The ions $NH_4$ and $SO_4$ tend to predominate in the solution and may be withdrawn as $(NH_4)_2SO_4$ solution and the other two K and $S_2O_8$ ions both tend to predominate in the solids and may be removed as $K_2S_2O_8$.

From the foregoing, it will be seen that the present invention provides either continuous or periodic fractionation, on a commercial scale, of two or more solutes in a common solvent where the solutes have the above defined solute composition equilibrium characteristics. It will be apparent that changes and modifications can be made which are within the scope of the invention. For instance, mechanical means, such as a conveyor, could be provided to insure the counterflow movement of the solid phase relative to the solution phase instead of employing the difference in density between the solid and solution phases to effect a separation by gravity. Likewise, if the solid phase is of such density as to rise in the solution phase, appropriate provision would be made for such reversed condition and the solute component A, which tends to predominate in the solid phase, would be removed from the top of the vertical tube 5 and the solute B, which tends to predominate in the solution phase, would be removed from the bottom of this vertical tube.

We claim:

1. The method of fractionating two or more different solutes from a solution of said solutes dissolved in a mutual solvent, and said solutes being capable of being dissolved in said mutual solvent to provide a substantially saturated solution phase in contact with a solid phase, and in which combination of solid and solution phases said solutes, independent of any temperature gradient, exert a drive to establish a solute composition equilibrium with one solute tending to predominate in the solid phase and the other solute tending to predominate in the solution phase, and in which combination when the proportion of the solute components in either phase is changed from that which obtains when the solute components in the solid and solution phases are in solute composition equilibrium with each other said drive motivates a change in the proportion of the solute components in both phases to restore equilibrium; which method comprises establishing body of said solution, supplying said solvent and the solutes to be fractionated to said body, providing solids of said solute component tending to predominate in said solution phase in one end of said body to establish said solid phase thereof, moving said solid phase toward the other end of said body, providing a solution of that solute tending to predominate in the solid phase in said other end of said body, moving said solution phase toward said one end of said body to provide countercurrent movement of said phases with reference to each other, removing said solution phase from said one end of said body, removing said solid phase from said other end of said body, and adjusting the rate of movement of said solid and solution phases with reference to each other to provide migration from the solution phase to the solid phase of the solute tending to predominate in the solid phase as said solid phase progressively contacts liquid richer in said solute tending to predominate in said solid phase and also to provide migration from the solid phase to the solution phase of the solute component tending to predominate in the solution phase as said solution phase progressively contacts solids richer in said solute tending to predominate in said solution phase.

2. The method set forth in claim 1 wherein said solids introduced at said one end of said body to establish the solid phase of said body are formed by crystallization from the solution phase being removed from said one end of said body.

3. The method set forth in claim 1 wherein said solids so introduced are formed by evaporation of solvent from the solution phase being removed from said one end of said body.

4. The method set forth in claim 1 wherein said solution introduced at said other end of said body is formed from the solid phase being removed from said other end of said body.

5. The method set forth in claim 4 wherein said solution so introduced is formed by contacting the solid phase being removed from said other end of said body with said mutual solvent and thereafter introducing the resulting solution into said other end of said body.

6. The method set forth in claim 4 wherein said solution so introduced is formed by introducing said mutual solvent into said other end of said body to dissolve a part of the solid phase in said other end of said body.

7. The method set forth in claim 1 wherein said countercurrent movement of said solid and liquid phases is effected by gravity.

8. The method set forth in claim 1 wherein said feed is supplied in the form of a solution of said solutes in the mutual solvent.

9. The method set forth in claim 8 wherein said feed solution is introduced at that place along said body where the composition of the solutes in the solution phase of said body approximates the composition of the solutes in the feed solution.

10. The method set forth in claim 1 wherein said feed is supplied in the form of said mutual solvent and mixed solids of said solutes.

11. The method set forth in claim 10 wherein said feed of mixed solids of said solutes is introduced at that place along said body where the composition of the solute components in the solid phase of said body approximates the composition of the solute components in said feed of mixed solids.

12. The method set forth in claim 1 wherein at least one of said solutes is formed by reaction in said body of other compounds.

13. The method set forth in claim 1 wherein said solutes are potassium persulfate and ammonium persulfate and wherein said potassium persulfate is at least in part formed by the reaction in said body of potassium sulfate with said ammonium persulfate.

References Cited in the file of this patent

UNITED STATES PATENTS 2,540,083   Arnold _____ Feb. 6, 1951